United States Patent [19]
Reischmann et al.

[11] Patent Number: 5,132,374
[45] Date of Patent: Jul. 21, 1992

[54] EXPOXIDE FLEXIBILIZERS BASED ON POLYLACTONE ADDUCTS

[75] Inventors: Franz-Josef Reischmann, Grenzach-Wyhlen, Fed. Rep. of Germany; Madan M. Bagga, Cambridge, England

[73] Assignee: Ciba-Geigy Corporation, Ardsley, N.Y.

[21] Appl. No.: 676,410

[22] Filed: Mar. 28, 1991

Related U.S. Application Data

[60] Division of Ser. No. 565,872, Aug. 9, 1990, abandoned, which is a continuation of Ser. No. 234,234, Aug. 18, 1988, abandoned.

[30] Foreign Application Priority Data

Aug. 25, 1987 [CH] Switzerland ............... 3243/87-7

[51] Int. Cl.$^5$ ............................ C08G 59/12
[52] U.S. Cl. .............................. 525/415; 549/562; 528/91; 528/103; 528/110; 528/111; 528/354; 156/330; 427/386
[58] Field of Search ............ 525/415; 549/562; 528/103, 110, 111, 91, 354; 156/330; 427/386

[56] References Cited

U.S. PATENT DOCUMENTS

| | | | |
|---|---|---|---|
| 3,408,421 | 1/1964 | Kurka | 260/830 |
| 4,086,293 | 4/1978 | Smith et al. | 260/830 |
| 4,101,603 | 6/1978 | Smith et al. | 525/415 |
| 4,261,871 | 4/1981 | Smith et al. | 260/18 |
| 4,386,191 | 5/1983 | Disalvo et al. | 549/562 |
| 4,521,570 | 6/1985 | Watanabe et al. | 525/415 |
| 4,522,984 | 6/1985 | Watanabe et al. | 525/415 |
| 4,725,653 | 2/1988 | Koleske | 528/110 |

FOREIGN PATENT DOCUMENTS 1543648 4/1979 United Kingdom .

Primary Examiner—John C. Bleutge
Assistant Examiner—Frederick Krass
Attorney, Agent, or Firm—JoAnn Villamizar

[57] ABSTRACT

Adducts of the formula I

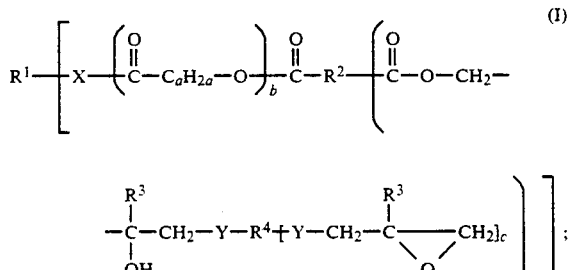

are described in which $R^1$ is an e-valent aliphatic radical after the removal of the functional groups, X is —O— or —NH—, $R^2$ is a d+1-valent carbocyclic-aromatic radical, $R^3$ is hydrogen or methyl, $R^4$ is an aliphatic, aromatic, or araliphatic c+1-valent radical, Y is —O—, —S— or —$NR^5$—, $R^5$ is hydrogen or

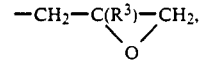

b is an integer from 2 to 15, b is an integer from 1 to 25, c is 1, 2 or 3, d is 1, 2 or 3 and e is 2, 3 or 4.

The adducts can be combined with latent curing agents and, if appropriate, other epoxy resins to give adhesives having good stability on storage and high flexibility.

4 Claims, No Drawings

EXPOXIDE FLEXIBILIZERS BASED ON POLYLACTONE ADDUCTS

This is a divisional of Ser. No. 565,872 filed Aug. 9, 1990 now abandoned, which is a continuation of Ser. No. 234,234 filed Aug. 18, 1988 now abandoned.

The present application relates to novel adducts of selected epoxy resins onto specific carboxyl-terminated polyalkylene lactones, to mixtures containing the said adducts in combination with other epoxy resins and latent curing agents, to the use of the adducts as flexibilizers for epoxy resins and to the use of the curable mixtures as adhesives.

It is known to use caprolactone as a reactive solvent in epoxy resin formulations. Combinations of epoxy resins with polyesters based on caprolactone are also known. The cured products from such mixtures are generally distinguished by a good flexibility and good low temperature properties.

Mixtures of carboxyl-terminated polycaprolactones and epoxy resins are known from British Patent No. A 1,565,580. According to the description, cycloaliphatic epoxy resins are preferably used and the mixtures have only a limited storage stability (up to two days). No adduct formation before the actual curing is described. Adducts formed from carboxyl-terminated polyesters and epoxy resins are known from British Patent No. A 1,182,728. Polycaprolactones which are obtained by reacting an aliphatic dicarboxylic acid with a large excess of ε-caprolactone are also described as polyesters. The cured products are distinguished by a good flexibility and a high impact strength and strength.

Adducts formed from polycaprolactones masked with aliphatic, cycloaliphatic or aromatic dicarboxylic acids and from cycloaliphatic epoxy resins are known from Japanese Patent No. A 59-30,817. The cured products are distinguished by good flexibility and by high strength. They can be employed as electrical insulating materials.

Polycaprolactones masked with trimellitic acid are known from British Patent No. A 543,648. The compounds can be employed as curing agents for powder lacquers based on epoxides. These mixtures are thus combinations of solid epoxy resins and solid curing agents present separately from one another in powder form.

Water-insoluble, carboxyl-terminated adducts formed from a cycloaliphatic diepoxide, an anhydride of a polycarboxylic acid and a polycaprolactone are described in U.S. Pat. No. A 4,086,294. These adducts can be converted, by reacting the carboxyl end groups with tertiary amines, into watersoluble, crosslinkable compounds which can be employed as coating materials. Crosslinking is carried out by heat or in the presence of a crosslinking agent, for example an aminoplast based on urea-formaldehyde. The adducts contain virtually no free epoxide groups.

Combinations of epoxy resins and adducts of hydroxyl-terminated polycaprolactones onto epoxy resins, for example epoxy resins based on bisphenol A or bisphenol F, are known from Japanese Patent No. A 61-44,915. The adducts are prepared under relatively severe conditions by reacting the epoxy resin with ε-caprolactone at temperatures of 100°-200° C. in the presence of a catalyst. The mixtures described have a high content of primary hydroxyl groups which can react with the curing agent during curing.

Adducts of polycaprolactone-polyols onto polyepoxides are known from EP-No. A 143,127. The polycaprolactone component is used in excess in the formation of the adduct, and the result is an adduct having a low epoxide content. It is preferable to use cycloaliphatic epoxy resins.

Adducts of specific, carboxyl-terminated polyalkylene lactones onto selected epoxy resins have now been found, and these can be thoroughly cured even in thick layers. Particularly in combination with heat-activatable, latent amine curers, it is possible to prepare formulations having a good stability on storage and at the same time a high reactivity when cured by heat, so that short curing times can be achieved.

The cured products are distinguished by an excellent resistance to moisture and changes in climate and are at the same time highly flexible. Furthermore, they have a high heat stability, so that, as a rule, no particular measures have to be taken against overheating adhesive joints. In addition, adhesive joints composed of the said adducts can be throughwelded.

The present invention relates to compounds of the formula I

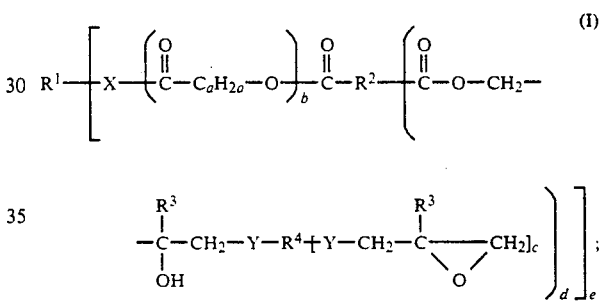

in which $R^1$ is an e-valent aliphatic radical after the removal of the functional groups, X is —O— or —NH—, $R^2$ is a d+1-valent carbocyclicaromatic radical, $R^3$ is hydrogen or methyl, $R^4$ is an aliphatic, aromatic or araliphatic c+1-valent radical, Y is —O—, —S— or —$NR^5$—, $R^5$ is hydrogen or

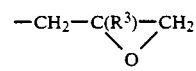

a is an interger from 2 to 15, b is an integer from 1 to 25, c is 1, 2 or 3, d is 1, 2 or 3 and e is 2, 3 or 4, subject to the proviso that the radicals $R^2$ to $R^5$ and Y and also the indices a, b, c and d can be different within a molecule within the scope of the definitions given.

The compounds of the formula I can be obtained by reacting an aliphatic lactone of the formula II with an aromatic polycarboxylic acid of the formula III or with one of its ester-forming derivatives, for example the anhydride, the acid chloride or the ester, and subsequently forming an adduct of the carboxyl-terminated product from II and III with an aliphatic, aromatic or araliphatic polyglycidyl compound of the formula IV by heating the components forming the adduct so that an adduct which can still be cured is formed

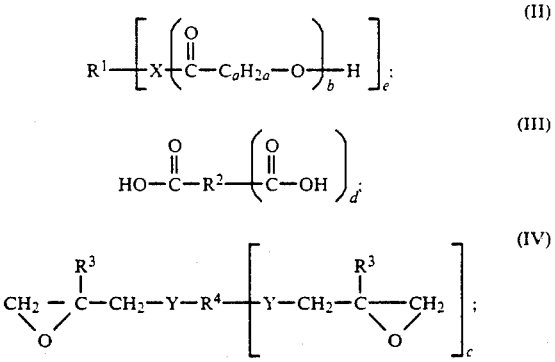

in these formulae the radicals $R^1$ to $R^4$, $X$ and $Y$ and also the indices a to e are as defined earlier in the text. Compounds of the formula II are known per se. They are derived from the addition of a lactone onto an aliphatic starter polyol or polyamine. Examples of suitable lactones are α-propiolactone, pivalolactone, β-butyrolactone, δ-valerolactone, ε-caprolactone, 7-hydroxyheptanoic acid lactone, 8-hydroxyoctanoic acid lactone, 9-hydroxynonanoic acid lactone, 10-hydroxydecanoic acid lactone and 15-hydroxypentadecanoic acid lactone. Polycaprolactones are the preferred compounds of the formula II.

Examples of aliphatic starter polyols $R^1$—$(OH)_e$ are ethylene glycol, 1,2-propylene glycol, 1,3-propylene glycol, 1,4-butanediol, 1,5-pentanediol, 1,6-hexanediol, 1,4-cyclohexanediol, 1,8-octanediol, 1,10-decanediol, polyethylene glycols, such as diethylene or triethylene glycol, polypropylene glycols, such as dipropylene or tripropylene glycol, 2-ethyl-1,3-hexanediol, 1,3-bis-(hydroxyethyl)-benzene, glycerol, 1,2,6-hexanetriol, trimethylolpropane, erythritol, pentaerythritol, neopentyl glycol or triethanolamine.

Examples of aliphatic starter polymers $R^1$—$(NH_2)_c$ are ethylenediamine, 1,2-propylenediamine, 1,3-propylenediamine, 1,4-diaminobutane, 1,6-di-aminohexane or diethylenetriamine.

The radical —$C_aH_{2a}$— can be linear or branched. Linear radicals are preferred.

The molecular weights of suitable polymers of the formula II are in the range from 200 to 6,000 (number average), preferably in the range from 300 to 3,000 and very particularly preferably in the range from 1,000 to 2,000. The preparation of these compounds is effected by processes which are known per se. A process for the preparation of polycaprolactone polyols is to be found in EP-A No. 143,121.

Linear polycaprolactones having molecular weights of 500-2,000 are preferably used as the polymers of the formula II. Such compounds are obtainable under the name CAPA ® from Interox Chem. Ltd.

Examples of compounds of the formula III are mononuclear or dinuclear, carbocyclic-aromatic dicarboxylic, tricarboxylic or tetracarboxylic acids, such as phthalic acid, isophthalic acid, terepthalic acid, trimellitic acid, pyromellitic acid, benzophenonetetracarboxylic acid, benzophenonedicarboxylic acid, bis-(3,4-dicarboxyphenyl)-methane, bis-(3,4-dicarboxyphenyl) ether, bis-(4-carboxyphenyl)-methane, bis-(4carboxyphenyl) ether, 1,4-dicarboxynaphthalene, 1,6-dicarboxynaphthalene or 1,4,6,8-tetracarboxynaphthalene or anhydrides thereof.

It is preferable to use the dicarboxylic acids or, in particular, their anhydrides. The following are examples of suitable polyglycidyl compounds of the formula IV:

I) Polyglycidyl or poly-(β-methylglycidyl) ethers which can be obtained by reacting a compound having at least two free alcoholic hydroxyl groups and/or phenolic hydroxyl groups and a suitably substituted epichlorohydrin under alkaline conditions, or in the presence of an acid catalyst, with subsequent treatment with an alkali.

Ethers of this type are derived, for example, from acyclic alcohols, such as ethylene glycol, diethylene glycol and higher poly-(oxyethylene) glycols, propane-1,2-diol or poly-(oxypropylene)-glycols, propane-1,3-diol, butane-1,4-diol, poly-(oxytetramethylene)-glycols, pentane-1,5-diol, hexane-1,6-diol, hexane-2,4,6-triol, glycerol, 1,1,1-trimethylolpropane, pentaerythritol, sorbitol and polyepichlorohydrins.

They can, however, also be derived, for example, from cycloaliphatic alcohols having aromatic nuclei, such as N,N-bis-(2-hydroxyethyl)-aniline or p,p'-bis-(2-hydroxyethylamino)-diphenylmethane.

The epoxy compounds can also be derived from mononuclear phenols, for example from resorcinol or hydroquinone; or they are based on polynuclear phenols, for example on bis-(4-hydroxyphenyl)-methane, 4,4'-dihydroxybiphenyl, bis-(4-hydroxyphenyl) sulfone, 1,1,2,2-tetrakis-(4-hydroxyphenyl)-ethane, 2,2-bis-(4-hydroxyphenyl)-propane or 2,2-bis-(3,5-dibromo-4-hydroxyphenyl)-propane, and on low-molecular novolaks composed of two to five phenyl nuclei and obtainable by condensing aldehydes, for example formaldehyde, acetaldehyde, chloral or furfuraldehyde, with phenols, such as phenol, or with phenols which are substituted in the nucleus by chlorine atoms or $C_1$–$C_9$alkyl groups, for example 4-chlorophenol, 2-methylphenol or 4-tert-butylphenol, or obtainable by condensation with bisphenols, as described above.

II) Poly-(N-glycidyl) compounds which are obtainable, for example, by dehydrochlorination of the reaction products of epichlorohydrin with amines containing at least two primary or secondary amino substituents. These amines are, for example, bis-(4-aminophenyl)-methane, m-xylylenediamine, bis-(4-methylaminophenyl)-methane, diethylenetriamine, triethylenetetramine, tetraaminobenzene or tetraaminobiphenyl.

III) Poly-(S-glycidyl) compounds derived from dithiols, for example ethane-1,2-dithiol or bis-(4-mercaptomethylphenyl) ether.

In order to prepare the carboxyl-terminated polyalkylene lactones, the hydroxyl-terminated polyester of the formula II is reacted with an excess or an equivalent amount of the carboxylic acid of the formula III or one of its ester-forming derivatives in a manner known per se. The reaction is described for polycaprolactones terminated with trimellitic acid in British Pat. No. A 1,543,648.

The compounds of the formulae II and III are preferably reacted in a molar ratio of 0.5:1 to 1:1. It is, of course, also possible to employ larger excesses of the polycarboxylic acid of the formula III, but care should be taken that gelling does not take place during the subsequent formation of adduct with the polyepoxide. The adduct formation between the carboxyl-terminated polyalkylene lactone and the polyglycidyl compound is also carried out in a manner known per se. This is effected, for example, by heating the two starting materials in the presence of a catalyst, so that a liquid to waxy precondensate is formed. The adduct is still fusible and can be cured further in a subsequent stage.

Examples of suitable catalysts are triarylphosphines, such as triphenylphosphine, tertiary amines, quaternary ammonium or phosphonium salts or chromium acetylacetonate.

As a rule, the adduct formation is carried out in the absence of a solvent. The reaction is preferably carried out under a protective gas, for example nitrogen.

The amount of reactants is advantageously so chosen that virtually all the carboxyl end groups of the polylactone have reacted and, on average, one 1,2-epoxide group is reacted per polyepoxide compound. This can be effected, for example, by so choosing the amounts of the adduct formed from II and III and of the epoxy compound IV that there are about 1.5–10 equivalents of epoxy groups to one equivalent of carboxyl end groups. As a rule, the reaction temperatures during the adduct formation are 80°–200° C., preferably 80°–150° C. The radical X is preferably —O—. The radical $R^1$ is preferably derived from an aliphatic diol and the radical —$C_a$—$H_{2a}$— is preferably linear. The radical $R^2$ is preferably a radical of a carbocyclic-aromatic dicarboxylic acid, particularly preferably a radical of the formula V

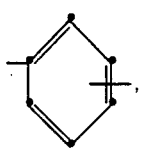 (V)

and very particularly preferably 1,2-phenylene. $R^3$ is preferably hydrogen. Y is preferably —O—. $R^4$ is preferably a radical of the formula VI or VII and b) a latent curing agent, for epoxy resins, which can be activated by heat.

The invention also relates to curable mixtures containing components a) and b), as defined above, and, in addition, c) an epoxy compound having at least two 1,2-epoxy groups per molecule.

The epoxy resins described earlier in the text as components for forming the adducts of the formula I can be employed as the epoxy component c). In addition, the following classes of epoxy resins can also be used:

IV) Polyglycidyl and poly-($\beta$-methylglycidyl) esters which can be obtained by reacting a compound having at least two carboxyl groups in its molecule with epichlorohydrin or glycerol dichlorohydrin or $\beta$-methyl epichlorohydrin. The reaction is advantageously carried out in the presence of bases.

Aliphatic polycarboxylic acids can be used as the compound having at least two carboxyl groups in the molecule. Examples of these polycarboxylic acids are oxalic acid, succinic acid, glutaric acid, adipic acid, pimelic acid, suberic acid, azelaic acid, sebacic acid or dimerized or trimerized linoleic acid.

It is also possible, however, to employ cycloaliphatic polycarboxylic acids, for example tetrahydrophthalic acid, 4-methyltetrahydrophthalic acid, hexahydrophthalic acid or 4-methylhexahydrophthalic acid.

Aromatic polycarboxylic acids can also be used, for example phthalic acid, isophthalic acid or terephthalic acid.

V) Heterocyclic epoxy resins, for example triglycidyl isocyanurate, N,N'-diglycidyl derivatives of cycloalkyleneureas, such as ethyleneurea or 1,3-propyleneurea, and N,N'-diglycidyl derivatives of hydantoins, such as 5,5-dimethylhydantoin.

VI) Cycloaliphatic epoxy resins, for example bis-(2,3-epoxycyclopentyl) ether, 2,3-epoxycyclopentyl glycidyl ether, 1,2-bis-(2,3-epoxycyclopentyloxy)-ethane or

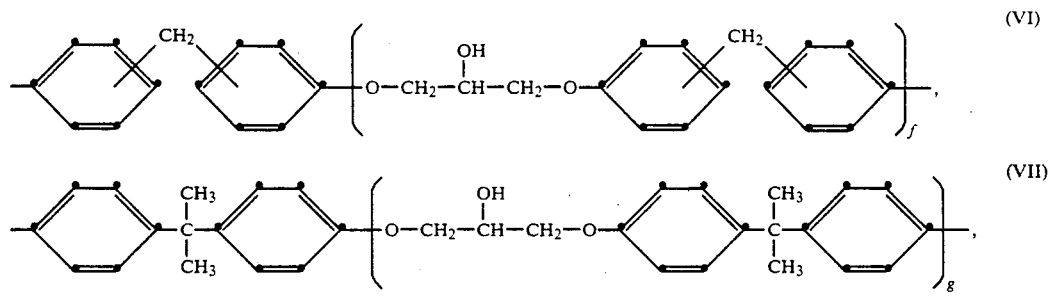

in which f and g are 0 or 1 to 4.

$R^4$ is very particularly preferably a radical of the formula VI in which f is 0 or 1.

The index a is preferably 5; b is preferably 1 to 12, very particularly 5 to 10; c is preferably 1; d is preferably 1; and e is preferably 2 or 3, very particularly preferably 2.

Compounds of the formula I which are very particularly preferred are those in which X is —O—, —$C_a$H$_{2a}$— is linear, $R^2$ is 1,2-phenylene, $R^3$ is hydrogen, $R^4$ is a radical of the formulae VI or VII in which f or g is 0, Y is —O—, a is 5, b is an integer from 1 to 12, c and d are 1 and e is 2.

The adducts of the formula I can be cured as such or they can be processed in combination with other epoxy resins and latent curing agents.

The invention therefore also relates to mixtures containing a) an adduct of the formula I as defined above 3,4-epoxycyclohexylmethyl 3',4'-epoxycyclohexanecarboxylate, or glycidyl ethers of cycloaliphatic alcohols, such as 1,3-dihydroxycyclohexane, 1,4-dihydroxycyclohexane, bis-(4-hydroxycyclohexyl)-methane, 2,2-bis-(4-hydroxycyclohexyl)-propane or 1,1-bis-(hydroxymethyl)-cyclohex-3-ene.

It is also possible, however, to use epoxy resins in which the 1,2-epoxy groups are attached to various heteroatoms or functional groups; these compounds include, for example, the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis-(5,5-dimethyl-1-glycidylhydantoin-3-yl)-propane.

If desired, a mixture of epoxy resins can be used in the compositions according to the invention.

Epoxy resins c) which are particularly preferred are polyglycidyl ethers of bisphenols, for example of 2,2-bis-(4-hydroxyphenyl)-propane or bis-(4-hydroxyphenyl)-methane, or of the aliphatic diols mentioned above, in particular butane-1,4-diol.

The following are examples of classes of compounds suitable for use as latent curing agents b) which can be activated by heat: primary or secondary aromatic amines, for example phenylenediamines, substituted phenylenediamines, for example 2,4-diethyl-3,5-diaminotoluene, 2,6-diethyl-3,5-diaminotoluene, bis-(aminophenyl)-methane (for example the 4,4'-derivative) or bis-(aminophenyl) sulfone (for example the 4,4'-derivative), and bis-(aminophenyl) ketone (for example the 4,4'-derivative); amidines, such as dicyandiamide or 1-cyano-3-(lower alkyl)-guanidines, for example the 3-methyl, 3,3-dimethyl or 3,3-diethyl derivatives; complexes of boron trihalides, in particular boron trifluoride or boron trichloride, with a tertiary aliphatic, cycloaliphatic or heterocyclic amine, in particular complexes with trimethylamine or octyldimethylamine; or anhydrides of poly-basic carboxylic acids, for example phthalic anhydride, tetrahydrophthalic anhydride or hexahydrophthalic anhydride.

Curable mixtures containing component a) and, if appropriate, component c), as defined above, and, as the component b), an aromatic amine having primary and/or secondary amino groups or an amidine, in particular dicyandiamide, are particularly preferred.

The curable mixtures of components a), b) and, if appropriate, c) can, in addition, also contain curing accelerators d). Examples of suitable curing accelerators d) are tertiary amines, salts or quaternary ammonium compounds thereof, for example benzyldimethylamine, 2,4,6-tris-(dimethylaminomethyl)-phenol, 1-methylimidazole, 2-ethyl-4-methylimidazole, 4-aminopyridine, tripentylammonium phenate or tetramethylammonium chloride; imidazoles and substituted imidazoles, for example 2-methylimidazole, 2-phenylimidazole, 1-benzyl-2-methylimidazole or 1-cyanoethyl-2-methylimidazole; amides, including substituted ureas, in particular ureas having aromatic radicals, for example N-(4-chlorophenyl)-N,N'-dimethylurea, N-(2-hydroxyphenyl)-N',N'-dimethylurea, N-(3-chloro-4-methylphenyl)-N',N'-dimethylurea or 2,4-bis-(N,N-dimethylureido)-toluene.

The curable mixtures according to the invention can also contain customary additives e), such as suitable plasticizers, for example dibutyl phthalate, dioctyl phthalate or tricresyl phthalate, or reactive diluents, such as phenyl glycidyl ethers or cresyl glycidyl ethers, butanediol diglycidyl ether or hexahydrophthalic acid diglycidyl ether.

Finally, it is possible to add to the curable mixtures before curing in any phase, as additives e), extenders, fillers and reinforcing agents, for example coal tar, bitumen, textile fibres, glass fibres, asbestos fibres, boron fibres, carbon fibres, mineral silicates, mica, powdered quartz, hydrated aluminium oxide, bentonite, kaolin, silica aerogel or metal powders, for example aluminium powder or iron powder, and also pigments and dyes, such as carbon black, oxide colours, titanium dioxide and others. Other customary additives e), for example flameproofing agents, such as antimony trioxide, thixotropic agents or flow control agents, such as silicones, waxes or stearates (which in some cases are also used as mould release agents) can also be added to the curable mixtures.

The proportion of curing agent b) or of curing accelerator d) depends on the type of curing agent and will be selected by those skilled in the art in a manner known per se. In the case of dicyandiamide, which is preferred, 0.1–0.5 mole of the curing agent will, as a rule, be employed per mole of epoxy groups. The proportion of additives e) is customarily 0–200% by weight, relative to the amount of components a) and, if appropriate, c).

The curable mixtures according to the invention can be prepared in a customary manner with the aid of known mixing units (stirrers, kneaders, rolls etc).

The mixtures, according to the invention, of a) and b) and, if appropriate, d) and other additives e), or of a) and b) and, if appropriate, c) and d) and other additives e), as a rule are liquid or preferably paste-like and are employed, in particular, as adhesives. The invention thus also relates to the use of these mixtures as adhesives or sealing compositions. The invention also relates to the use of the adducts of the formula I as flexibilizers for epoxy resins.

The mixtures according to the invention are advantageously cured in the temperature range from 50°–250° C., preferably from 100°–240° C.

The glueing is carried out in a manner known per se, by applying the liquid or paste-like adhesive formulation to a substrate, for example greasy steel, by means of a suitable device, bringing the surfaces to be glued into contact and then curing the adhesive by means of heat.

However, the mixtures according to the invention are also suitable as joint fillers or for the production of surface coatings. They can be used in the non-filled or filled state in the particular formulation appropriate for the specific intended use.

The following examples illustrate the invention:

Preparation Examples

EXAMPLE 1

800 g of polycaprolactone (CAPA ® 222 from Interox Chem. Ltd.; molecular weight 2,000; OH number 56) are melted in an oven at 60° C. and poured into a reaction flask. 118.4 g of phthalic anhydride are added and the mixture is heated to 70° C., with stirring. 0.5 g of dry tetramethylammonium chloride is then added. The reaction temperature is increased to 140° C. and is kept at this level for 5 hours. The phthalic anhydride dissolves completely in the reaction mixture from 130° C. After cooling, the product solidifies to give a waxy solid. The acid number of the product is 0.80 equivalents/kg. 100 g of this product and 100 g of diglycidyl ether based on bisphenol F (epoxide content: 6.2 equivalents/kg) are heated together with 0.2 g of triphenylphosphine at 150° C. under nitrogen for two hours. An adduct with an epoxide content of 2.54 equivalents/kg results (theory: 2.71 equivalents/kg).

EXAMPLE 2

The procedure is as in Example 1, 600 g of polycaprolactone (CAPA ® 212 from Interox Chem. Ltd.; molecular weight 1,000; OH number 113.3) being reacted with 179.64 g of phthalic anhydride and 0.45 g of tetramethylammonium chloride. The acid number of the product is 1.32 equivalents/kg. Analogously to Example 1, 100 g of this product are reacted with 100 g of diglycidyl ether based on bisphenol F (epoxide content: 6.2 equivalents/kg) and 0.2 g of triphenylphosphine. An adduct with an epoxide content of 2.18 equivalents/kg results (theory: 2.44 equivalents/kg).

EXAMPLE 3

The procedure is as in Example 1, 600 g of polycaprolactone (CAPA® 205 from Interox Chem. Ltd.; molecular weight 830; OH number 135) being reacted with 214 g of phthalic anhydride and 0.5 g of tetramethylammonium chloride. The acid number of the product is 1.7 equivalents/kg. Analogously to Example 1, 100 g of this product are reacted with 100 g of diglycidyl ether based on bisphenol F (epoxide content: 6.2 equivalents/kg) and 0.2 g of triphenylphosphine. An adduct with an epoxide content of 2.01 equivalents/kg results (theory: 2.25 equivalents/kg).

USE EXAMPLES

The following adhesive formulations are prepared and tested:

EXAMPLE I

| | |
|---|---|
| Adduct according to Example 2: | 25.0 parts |
| Dicyandiamide | 1.5 parts |
| Chlorotoluron | 0.1 part |
| Thixotropic agent | 1.0 part |
| Result in the mandrel bending test*) after curing: no cracks. | |

EXAMPLE II

| | |
|---|---|
| Adduct according to Example 3: | 25.0 parts |
| Dicyandiamide | 0.7 part |
| Chlorotoluron | 0.1 part |
| Thixotropic agent | 0.5 part |
| Result in the mandrel bending test*) after curing: no cracks. | |

EXAMPLE III

| | |
|---|---|
| Adduct according to Example 2: | 25.00 parts |
| Dicyandiamide | 0.76 part |
| Chlorotoluron | 0.10 part |
| Wollastonite | 7.50 parts |
| Talc | 3.75 parts |
| Thixotropic agent | 0.90 part |

Curing: 30 minutes at 180° C., substrate: steel sheet
Tensile shear strength: 4-5 MPa
Tensile shear strength after 7 day condensation water test**): 3-3.5 MPa

*)A layer of adhesive (l: 7 cm. W: 1 cm. H: 2 mm) is applied to a steel sheet 1 mm thick by means of a template. Curing is then carried out at 180° C. for 30 minutes. Thereafter, the sample is kept at room temperature for 24 hours and then bent over a mandrel of 80 mm diameter. The mandrel has the same temperature as the sample here.
**) according to DIN 50017

We claim:

1. A mixture consisting essentially of
a) an adduct of the formula I

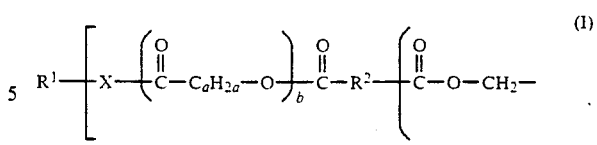

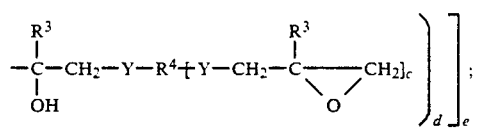

in which $R_1$ is an e-valent aliphatic radical after removal of the functional groups, X is —O— or —NH—, $R_2$ is a d+1-valent carbocyclic-aromatic radical, $R_3$ is hydrogen or methyl, $R_4$ is an aliphatic, aromatic or araliphatic c+1-valent radical, Y is —O—, —S— or —NR$_5$—, $R_5$ is hydrogen or

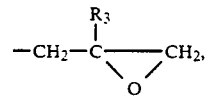

a is an integer from 2 to 15, b is an integer from 1 to 25, c is 1, 2 or 3, d is 1, 2 or 3, e is 2, 3 or 4, subject to the proviso that the radicals $R_2$ to $R_5$ and Y and also the indices a, b, c and d can be different within a molecule within the scope of the definitions given,
b) a latent curing agent for epoxy resins, which can be activated by heat, selected from the group consisting of an aromatic amine having primary or secondary or primary and secondary amino groups, an amidine, a complex of boron trihalides with a tertiary aliphatic, cycloaliphatic or heterocyclic amine, and an anhydride of a poly-basic carboxylic acid, and optionally,
c) an epoxy compound which is different from component a) having at least two 1,2-epoxy groups per molecules.

2. A mixture according to claim 1 wherein said latent curing agent is an aromatic amine having primary or secondary or primary and secondary amino groups or an amidine.

3. A method of adhering two surfaces together comprising applying a mixture according to claim 1 to one surface bringing the surfaces to be adhered in contact and heat curing the mixture according to claim 1.

4. A method of coating a surface comprising coating on said surface a mixture according to claim 1 and heat curing said coated surface.

* * * * *